United States Patent [19]

Abo et al.

[11] Patent Number: 4,920,494
[45] Date of Patent: Apr. 24, 1990

[54] FUEL MONITORING ARRANGEMENT FOR AUTOMOTIVE INTERNAL COMBUSTION ENGINE CONTROL SYSTEM

[75] Inventors: Toshimi Abo, Yokohama; Hiroshi Satoh; Nobutaka Takahashi, both of Yokosuka, all of Japan

[73] Assignee: Nissan Motor Company, Limited, Yokohama, Japan

[21] Appl. No.: 94,979

[22] Filed: Sep. 9, 1987

[30] Foreign Application Priority Data

Sep. 9, 1986 [JP] Japan ................... 61-212006

[51] Int. Cl.$^5$ .............................. F02D 43/00
[52] U.S. Cl. ................ 364/431.05; 123/425; 123/435
[58] Field of Search ........... 364/431.03, 431.04, 364/431.05, 431.10; 123/425, 435, 486, 1 R, 1 A, 440, 492, 493

[56] References Cited

U.S. PATENT DOCUMENTS

| | | | |
|---|---|---|---|
| 3,750,635 | 8/1973 | Hoffman et al. | 123/497 X |
| 4,495,930 | 1/1985 | Nakajima | 123/1 A X |
| 4,531,399 | 7/1985 | Aono | 73/4 R |
| 4,538,454 | 9/1985 | Aono | 73/115 |
| 4,556,030 | 12/1985 | Aono | 123/425 |
| 4,594,669 | 6/1986 | Hosaka | 364/431.05 |
| 4,619,236 | 10/1986 | Okada et al. | 123/425 |
| 4,630,584 | 12/1986 | Higashiyama et al. | 123/425 |
| 4,640,251 | 2/1987 | Harada et al. | 73/35 X |
| 4,706,630 | 11/1987 | Wineland et al. | 123/1 A X |

*Primary Examiner*—Eugene R. LaRoche
*Assistant Examiner*—Seung Ham
*Attorney, Agent, or Firm*—Foley & Lardner, Schwartz, Jeffery, Schwaab, Mack, Blumenthal & Evans

[57] ABSTRACT

The pressure of a combustion chamber is monitored and a pressure history in terms of crank angle, compiled over the compression and expansion phases of the engine for a period following a change from a non-transitory mode of operation to a transitory one. This data is used to derive a variable such as the maximum pressure or the like, the development characteristics of which are used to determine the type of fuel (fuel composition) being supplied. The fuel supply under transitory or both transitory and non-transitory modes of operation is modified in accordance with the fuel type analysis. During engine start-up the initial fuel supply can be modified in accordance with the last recorded analysis data.

21 Claims, 16 Drawing Sheets

INJECTION CONTROL ROUTINE

FIG.26
| f2 | f2 | f1 | f1 | f1 | f1 |
| f2 | f2 | f2 | f1 | f1 | f1 |
| f3 | f3 | f2 | f2 | f1 | f1 |
| f4 | f3 | f2 | f2 | f1 | f1 |
| f5 | f4 | f3 | f2 | f2 | f1 |
| f5 | f5 | f4 | f2 | f2 | f1 |
$\Delta$COG ↑
$\Delta$ PMAX →
FIG.27
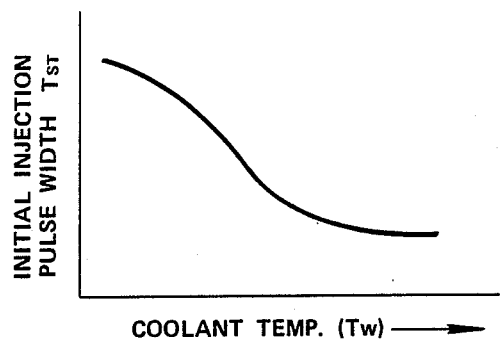
INITIAL INJECTION PULSE WIDTH $T_{ST}$
COOLANT TEMP. (Tw) →
FIG.28
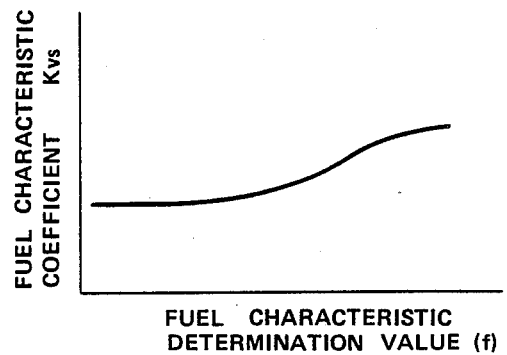
FUEL CHARACTERISTIC COEFFICIENT $K_{vs}$
FUEL CHARACTERISTIC DETERMINATION VALUE (f)

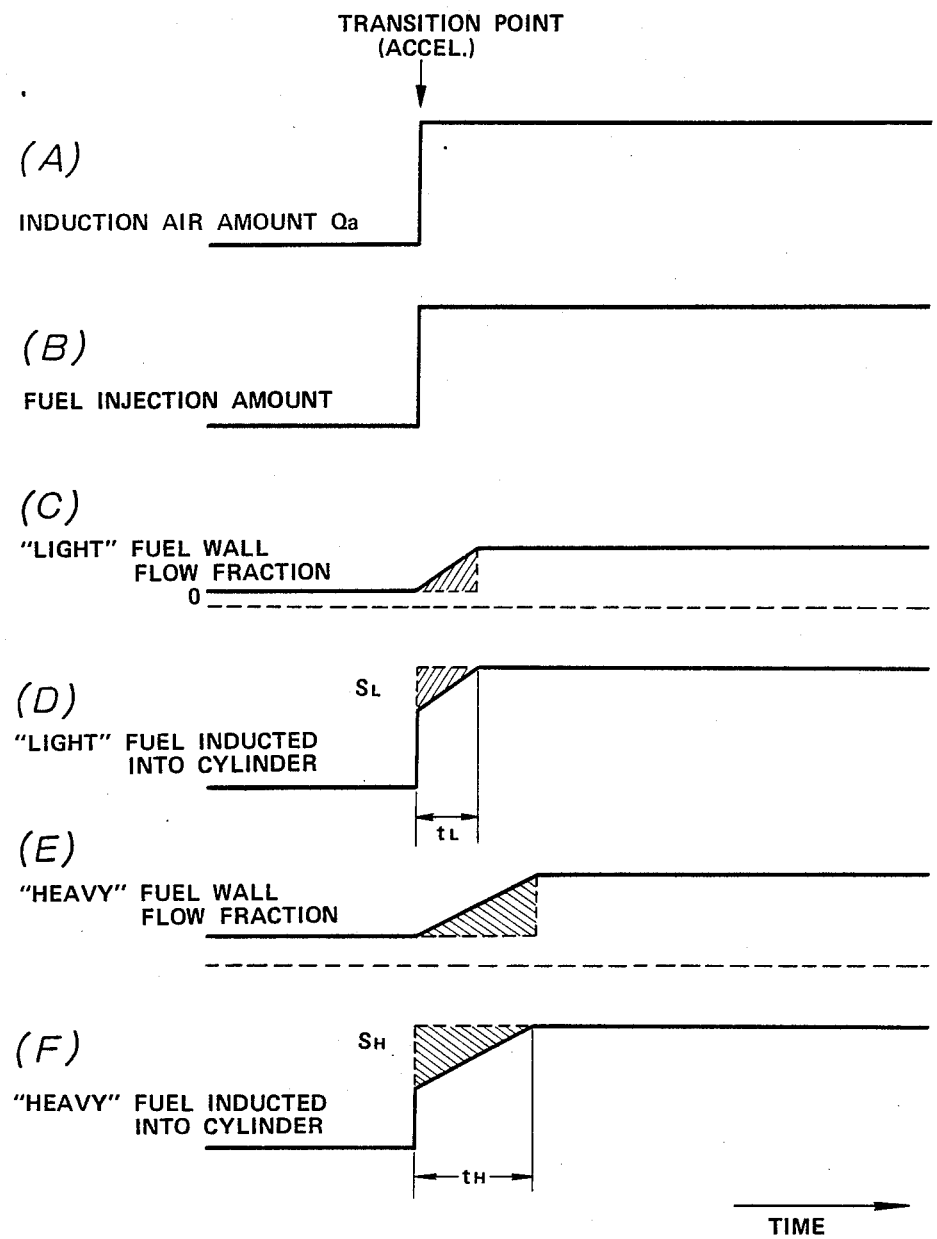

FUEL MONITORING ARRANGEMENT FOR AUTOMOTIVE INTERNAL COMBUSTION ENGINE CONTROL SYSTEM

BACKGROUND OF THE INVENTION

1. Field of the Invention

The present invention relates generally to a fuel supply system and more specifically to a system which monitors one or more operational parameters of the engine, determines the nature of the fuel being combusted and then subsequently controls the fuel supply in accordance with the analysis in a manner which optimizes transitional engine operation.

2. Description of the Prior Art

It has been previously proposed to sense engine knock, and to determine, using this in combination with other engine operational parameters, the octane rating of the fuel being combusted and to modify the ignition timing etc., on the basis of the octane analysis. An example of this type of system is found in U.S.P. No. 4,630,584 issued on Dec. 23, 1986 in the name of Higashiyama et al.

However, this type of system only utilizes octane rating and driving conditions and does not take the other influencing factors into account. That is to say, the fuel supplied into the induction system by SPI or MPI systems, for example, separates into two distinct fractions before reaching the combustion chamber. Viz., some of the fuel assumes a gaseous form and is entrained in the air flow per se while the remainder remains in a liquid state and forms a film which flows along the walls of the induction system conduits. Depending on the composition of the fuel, the fraction which volatilizes and enters the combustion chamber or chambers of the engine in a gaseous state and the fraction which flows along the walls of the induction system, varies considerably. For example, if the fuel contains a relatively large highly volatile fraction, the amount of liquid running on the walls of the induction system conduiting will tend to be reduced as compared to the amount which is gasified and entrained in the air flow; and vice versa. Further, if the fuel consists of gasoline mixed with an amount of alcohol, it is necessary to supply a larger amount of fuel in order to produce the required power output as well as take the effect of the alcohol on the gassified/wall flow (liquid) fraction balance into account. For example, as shown in FIG. 29, in the event that the engine is operating under steady state conditions and the driver depresses the accelerator in order to accelerate the vehicle, the amount of air inducted into the engine rises sharply as shown in trace 29A. In response to this the amount of fuel supplied into the induction system can be increased in a manner to essentially parallel the change in air flow (see trace 29B). However, there is a transitional period wherein this measure does not maintain the desired A/F. As shown in traces 29C to 29D, the time required for the more volatile fraction of the fuel (referred to hereinafter as "light" fuel) and the less volatile fraction (hereinafter referred to as "heavy" fuel) to actually reach the combustion chambers varies markedly. Viz., the gassified and wall flow fractions of the light fuel are able to reach and enter the combustion chambers in a time tL while in the case of the heavy fuel, the time require for the corresponding fractions to reach the same requires a time tH.

Thus, during the initial period of transitional modes of engine operation it is clear that the air-fuel ratio of the air-fuel mixture entering the combustion chambers can fluctuate widely from the intended value depending on the composition of the fuel.

In more specific terms, in the case of electronically controlled fuel injected engines the fuel injection control signal pulse width is calculated using the following equation:

$$Ti = Tp(COEFF + Kacc) + ALPHA + Ts \qquad (1)$$

wherein:
Tp denotes the basic pulse width;
Kacc denotes a basic correction factor which varies with the amount of acceleration demanded;
COEFF denotes a compound correction factor which takes into account a number of variables other than acceleration;
ALPHA denotes a feed-back control air-fuel ratio correction factor; and
Ts denotes the rise time required for the injector to actually begin injecting after the control signal is applied to thereto.

If the correction factors are fixed and selected to suit a light fuel content, the accuracy thereof lowers as the content of the heavy fuel increases and the time required for the fuel to actually reaches the combustion chamber increases from time tL toward time tH; and vice versa. As the accuracy of the correction factors lowers, so does the accuracy of the injection control. This results in poor A/F control during acceleration and similar transitional modes of engine operation inducing an attendant loss of acceleration characteristics and fuel economy.

Further, during engine start-up the wall flow fraction increases due to the inherently low engine temperatures and reduced vaporization characteristics. Again, if the correction factors are predetermined in a manner which optimizes for light fuel, as the fraction of heavy fuel increases injection control accuracy is lost to a notable degree and thus invites a loss of fuel economy and emission control.

Thus, in order to accurately control the supply of fuel to the engine during transient modes of operation, it is necessary to know the composition (as different from the octane rating) of the fuel which is currently being injected or otherwise being supplied into the engine so as to enable the desired level of injection control to be maintained. However, until this time a technique via which the analysis of the fuel content can be carried out in situ and in close to real time has been lacking.

SUMMARY OF THE INVENTION

It is an object of the present invention to provide a system whereby it is possible to monitor an engine operation parameter and determine on the basis of this what the nature of the fuel is, and appropriately modify the fuel supply control in a manner as to optimize the operation of the engine particularly during transient modes of operation.

In brief, the above object is achieved by using an arrangement wherein the pressure which develops in a combustion chamber is monitored and a pressure history, in terms of crank angle, compiled over the compression and expansion phases for a period following a change from a non-transitory mode of operation to a transitory one. This data is used to derive a variable such as the maximum pressure or the like, the development characteristics of which are used to determine the type of fuel (fuel composition) being supplied. The fuel supply under transitory or both transitory and non-transitory modes of operation is modified in accordance with the fuel type anaylsis. During engine start-up the initial fuel supply can be modified in accordance with the last recorded "analysis" data.

More specifically, a first aspect of the present invention takes the form of a method of controlling an internal combustion engine which features the steps of: sensing a parameter which varies with the combustion process which occurs in a combustion chamber; determining a first variable based on the sensing of the parameter; and determining the type of fuel being supplied to the engine using the first variable.

A second aspect of the present invention takes the form of an apparatus for controlling an internal combustion engine means for sensing a parameter which varies with the combustion process which occurs in a combustion chamber of the engine; means for determining a first variable based on the sensed magnitude of said parameter; and means for using the first variable to determining the type of fuel being supplied to the engine.

BRIEF DESCRIPTION OF THE DRAWINGS

FIG. 26 shows a two dimensional matrix type table in which fuel characteristic determination values (f) are arranged in terms of DELTA COG and DELTA PMAX;

FIG. 27 is a graph which shows the relationship between the value of an initial injection pulse width Tst used during cranking of the engine and the level of the engine coolant; and FIG. 28 is a graph showing the relationship between the fuel characteristic coefficient Kvs and fuel characteristic determination value (f) which is utilized in the sixth embodiment of the present invention; and FIGS. 29(A)-(F) are a timing chart which show the change in the amount of fuel which enters the combustion chamber(s) due to the "light" and the "heavy" fuel fractions.

DETAILED DESCRIPTION OF THE PREFERRED EMBODIMENTS

Figure 1:
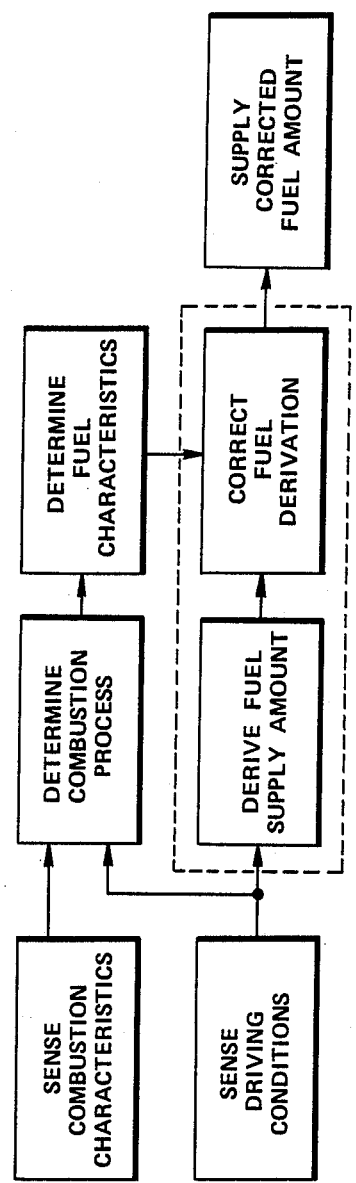
FIG. 1 shows in schematic block form the steps and/or functions which characterize the basic operations of the present invention.

FIG. 1 schematically outlines in block diagram form the characteristic processes which are conducted in accordance with the present invention. As shown, a preselected combustion characteristic or parameter and the instant set of driving conditions are sensed. The step of sensing the combustion characteristics includes sensing the pressure in one of the combustion chambers of the engine and the corresponding crank angle. The step of sensing the driving conditions in the embodiments of the invention include sensing the temperature of the engine coolant (or alternatively the engine per se), the engine speed, the load on the engine (such as indicated by one or a combination of: the air induction amount; throttle setting; an idle switch; and induction vacuum or the like). Using this data the combustion process characteristics are determined and depending on the rate at which the pressure changes and subsequently stablizes, a determination as to nature of the fuel actually being supplied at that time is made. Depending on the nature of the fuel the amount of fuel which is to be injected is adjusted.

Figure 2:
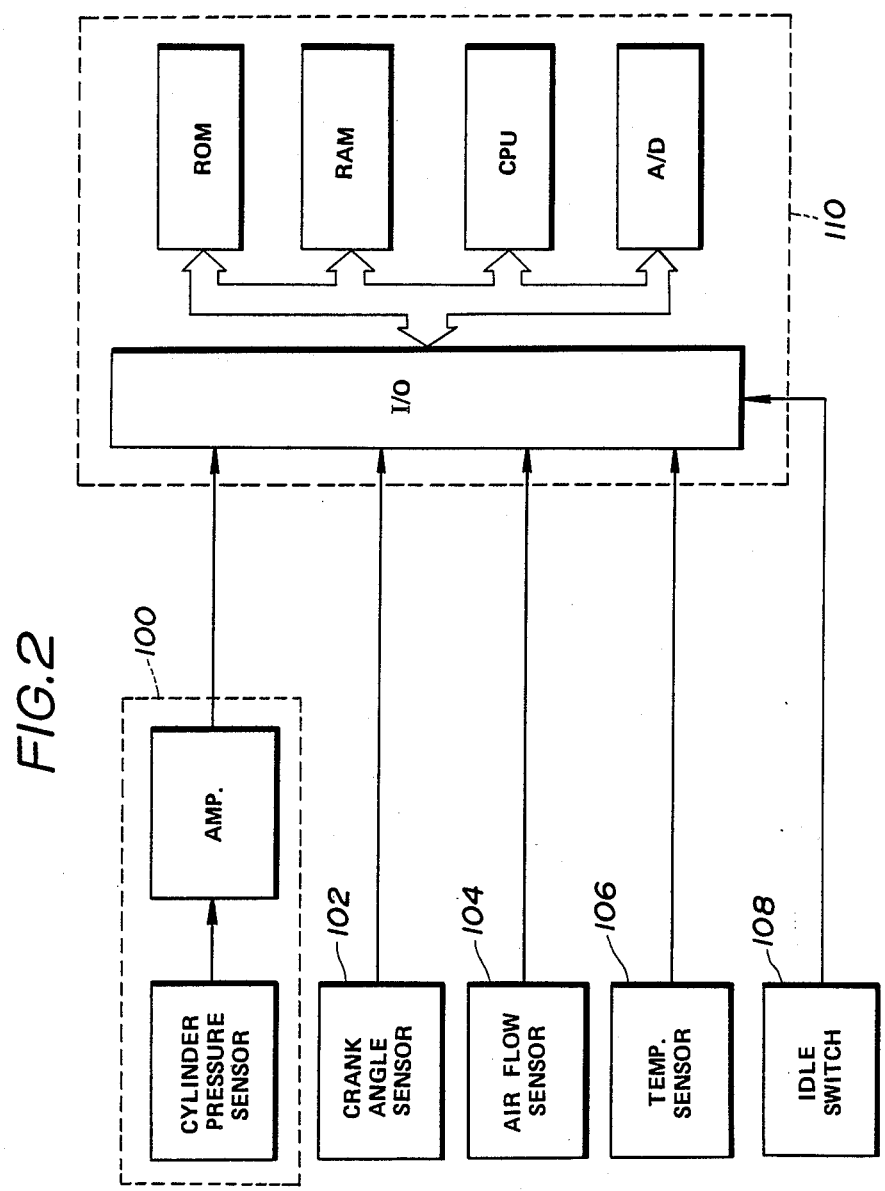
FIG. 2 shows in block diagram form the sensor/control unit arrangement which is used to implement the embodiments of the present invention.

FIG. 2 schematically shows the hardware arrangement via which the embodiments of the invention are implemented. This arrangement includes a plurality of pressure sensors 100-108 and a control circuit 110 which is responsive to the outputs of the sensors.

Figure 3:
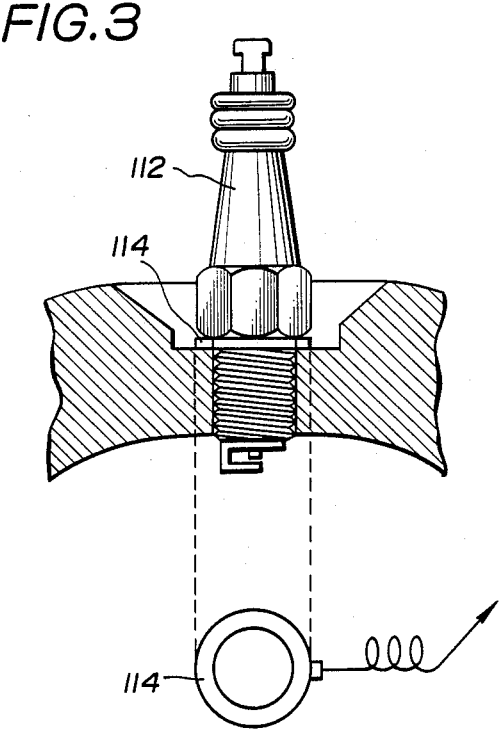
FIG. 3 is a partially sectioned elevation showing the provision of a piezo type strain gauge which is disposed between a spark plug and an engine cylinder head in a manner which enables the pressure history of each cycle of a combustion chamber to be selectively sampled and recorded.
Figure 4:
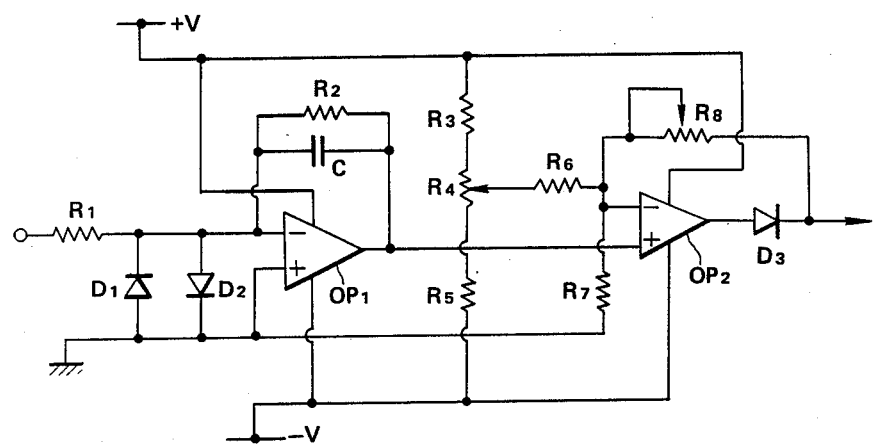
FIG. 4 is a circuit diagram showing an example of an amplifier circuit arrangement used in connection with the pressure sensor (strain gauge) shown in FIG. 3 for modifying the output of the same to a level suitable for input to the control circuit shown in FIG. 2.

The sensors in this instance include a pressure cylinder sensor arrangement 100 which, as shown in FIG. 3, comprises an annular piezo electric strain gauge 114 (pressure sensor) disposed between a spark plug 112 and the cylinder head (no numeral) and an amplifier circuit (an example of which is shown in FIG. 4). The sensor arrangement further includes a crank angle sensor 102; an air flow sensor 104; a coolant temperature sensor 106; and an idle switch 108. The signals generated by the above mentioned sensors are applied to an I/O board of a microprocessor included in the control circuit 110. In this embodiment the processor is equipped with a A/D converter in addition to at least one CPU, RAM and ROM.

Figure 5:
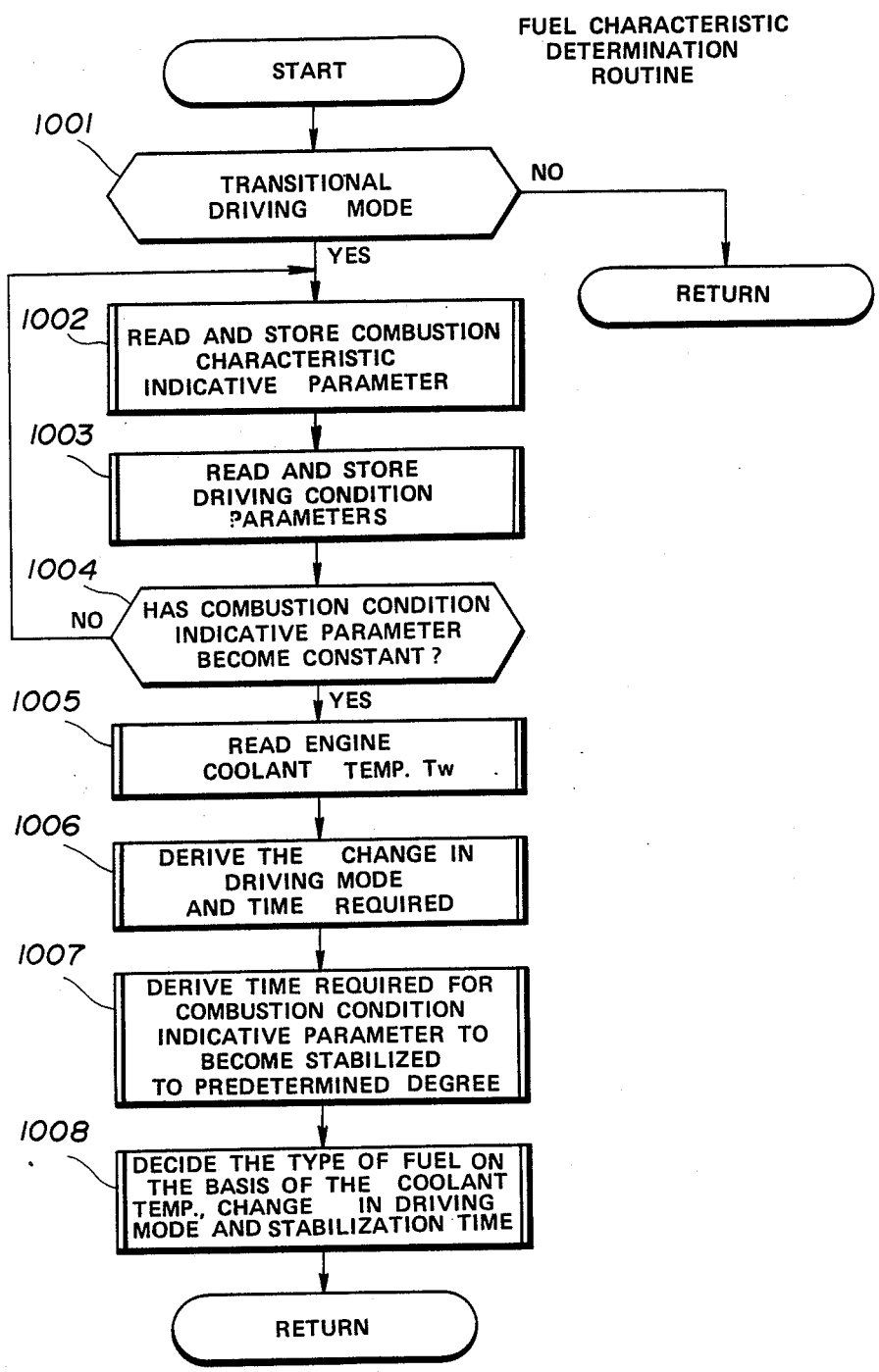
FIG. 5 is a flow chart showing the steps, according to a first embodiment of the present invention, which characterize the process via which the nature of the fuel being combusted is determined using the output of the pressure sensor shown in FIG. 3, during transitional mode of engine operation.

FIG. 5 shows, in flow chart, form the steps which characterize the control implemented by a first embodiment of the present invention. The program which executes the illustrated steps is arranged to be run a predetermined intervals. The concept which underlies this first embodiment will be discussed hereinunder with reference to FIGS. 6 to 8.

Figure 6:
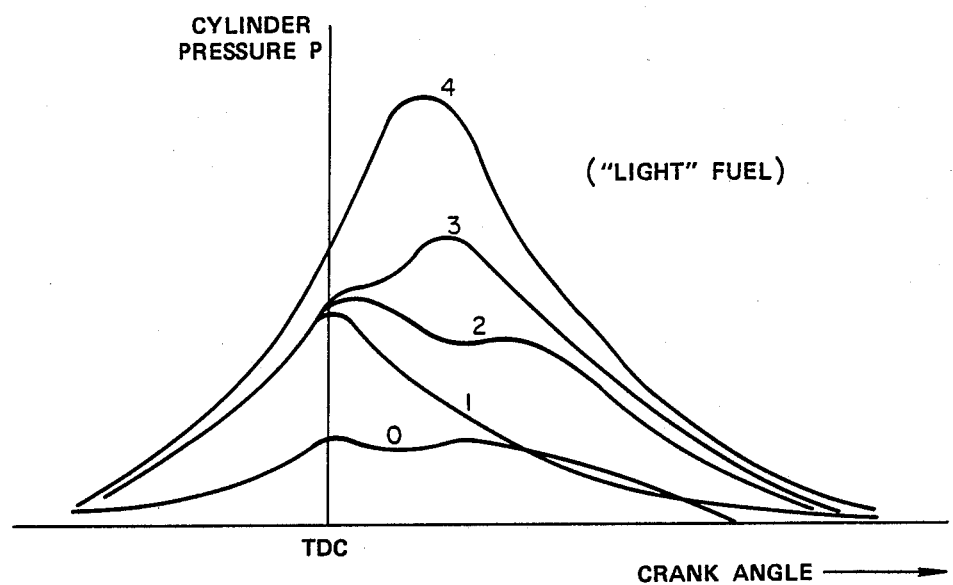
FIGS. 6 and 7 are graphs showing in terms of (a) cylinder pressure and (b) piston position (in terms of crank angle), a plurality of characteristic pressure histories which are developed during various engine operational modes, when the engine is operated on light and heavy fuel respectively.
Figure 7:
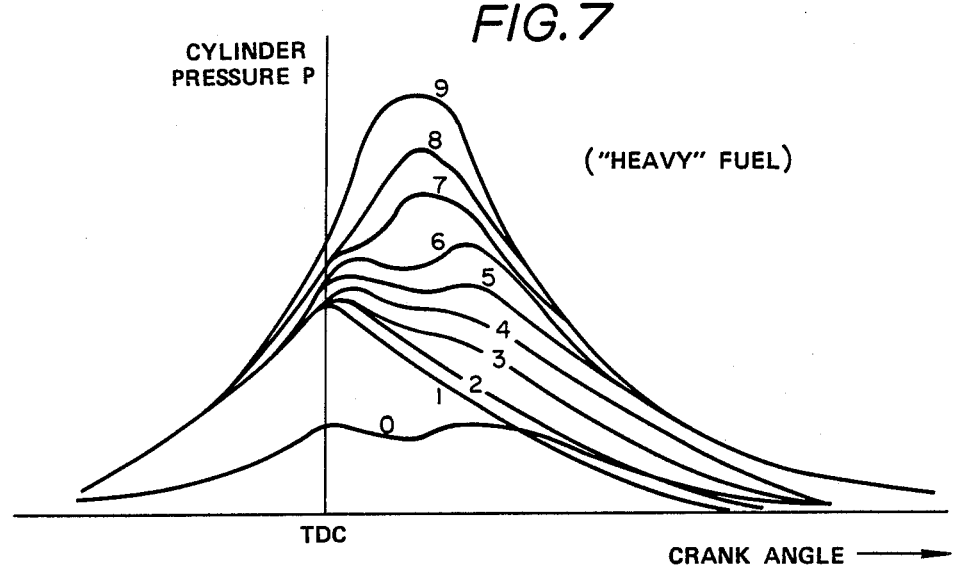

FIGS. 6 and 7 show the changes in cylinder pressure which occur when the load on the engine is increased to a given level from idling condition. FIG. 6 denotes the pressure development which occurs with "light" fuel.

FIG. 7 shows the corresponding development which occurs when the engine is operated on "heavy" fuel. In both of these figures trace 0 denotes the pressure which developes in a given cylinder when the engine is idling.

In FIG. 6 traces 1-4 denote the pressure "histories" (as they will be referred to hereinafter) which occur in the first to fourth cycles following the point in time when the demand for engine power is increased from idling. As shown, the maximum cylinder pressure for the instant power demand is developed during the fourth cycle when the engine is operated on "light" fuel while, as shown in FIG. 7, due to slower evaporational characteristics the "heavy" fuel the maximum cylinder pressure does not occur until the ninth cycle.

Figure 8:
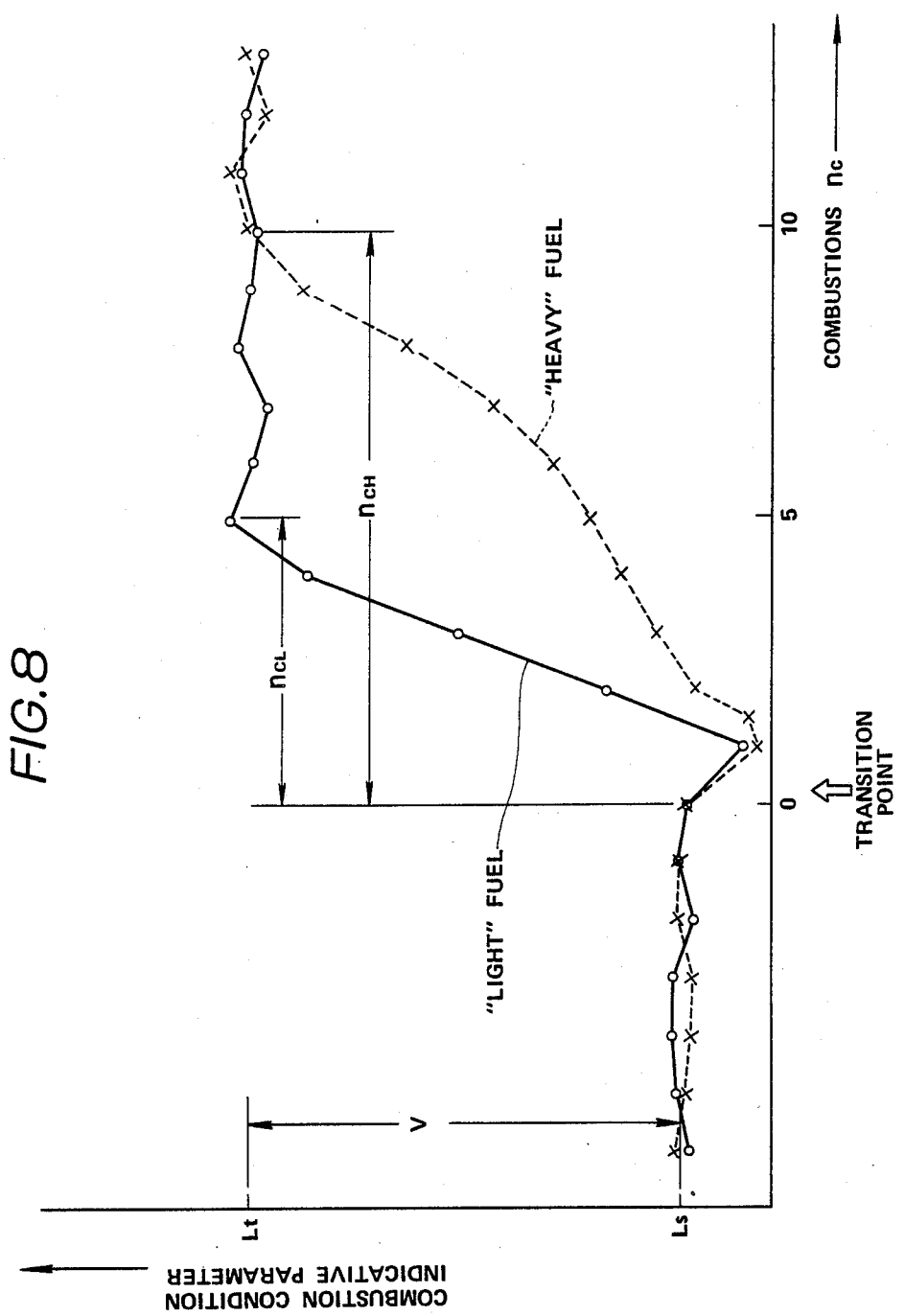
FIG. 8 is a graph showing in terms of a parameter which varies with the state of the combustion which occurs in the combustion chamber, and the number of cycles or combustions, the difference in the pressure development which occurs when light and heavy fuels are supplied into the engine induction system.

FIG. 8 shows the above phenomenon in terms of the number of engine cycles (combustions) and a parameter "L" which can be the maximum cylinder pressure or the average effective pressure as used in the instant graph. It will be noted that by dividing the the number of combustions (eg. nCL and nCH) with the engine speed, the time required for the pressure characteristics to become essentially constant can be obtained.

In the first embodiment the pressure is deemed to have stablized when the fluctuation in the pressure varies within an envelope which is plus or minus 10% of the steady state operation value. Viz., (Lt +/− |Lt−Ls| ×0.1) The time (or alteratively the number of combustions or cycles of the engine) from the point where the transition mode of operation begins to the time that the pressure stablizes is denoted by tC.

As will be noted from FIG. 8 in particular, with light fuel stabilization tends to occur after the fourth or fifth cycle ($n_{CL}$) whereas with heavy fuel stablization cannot be expected until about the tenth or eleventh cycle ($n_{CH}$). By selecting a basic value $n_{CO}$ to be intermediate of the above mentioned two values, for example set $n_{CO}$ at 7 cycles, it is possible by comparing the stablization time with this value to determine whether the fuel being supplied is light or heavy.

Referring back to FIG. 5 it will be noted that the first step 1001 of the fuel characteristic determination routine depicted therein is such as to determine whether the engine is operating under steady state conditions or has entered a transitional mode of operation. This can be determined by sampling the outputs of the idle switch 108 or alternatively outputs of one of both of the crank angle sensor 102 or air flow sensor 104. For example, it is possible to determine whether the frequency of the crank angle sensor 104 output is increasing or decreasing and or sense the change in the output of the air flow sensor 104. The various other techniques via which the beginning of a transitional mode of operation can be detected will be apparent to those skilled in the art of automotive engineering and as such no further discussion as to the point will given for brevity.

In the event that the engine is operating under steady state conditions the program returns. However, if a transitional mode of operation is detected, the program flows to step 1002 wherein the output of the pressure sensor 100 and the crank angle sensor 102 are sampled and the values set in RAM. At step 1003 the outputs of the sensors 102 to 108 are selectively sampled in order to determine the instant conditions under which the engine is being induced to operate.

At step 1004 the output of the pressure sensor 100 is sampled and a determination made as to whether the output has become constant. In this embodiment the output may be deemed to have become constant if, for example, a maximum value has been detected and the pressure is varying within plus or minus 10% of a running average of two readings or the like.

At step 1005 the output of the engine coolant sensor 106 is sampled and the value set in RAM. It will be noted at this point that it is possible according to the present invention to execute the instant fuel characteristic determination only while the engine temperature is below a predetermined level. The reason for this is that that a low engine temperatures the difference between the evaporation characteristics of light and heavy fuel is very pronounced and the effect on A/F control by the content of the fuel likewise very pronouced. The effect however, decreases with increase in engine temperature. By way of example, note can be taken of the graph shown in FIG. 19 wherein it is shown that as the engine coolant temperature increases the value of the acceleration correction factors for light and heavy fuel reduce to approximately zero.

By inducing the program to return once the engine temperature is sufficiently high enables a reduction in the amount of data which must be set in ROM in the event that a table look-up technique is utilized in connection with step 1008 which will be described in more detail hereinlater.

In step 1006 the change in driving mode, in this case V wherein V=Lt−Ls and the time required, viz., the time tp required for the the peak combustion pressure to be sensed from from the point where the transitional mode is intiated, are derived and set in RAM.

At step 1007 the time required for the pressure in the combustion chamber to enter the envelope which defines steady state operation is determined and set in RAM.

Alternately, it is possible to use a combination of V and tp as a driving condition indicative parameter or coefficient (step 1007) and set this value directly as the value of tc. This enables a simplification in the processes involved in connection with the derivation of the value of tc. For each driving condition the combination of V and tc will change and thus provide a value which varies in accordance with the same.

In step 1008 the values of Tw, V, tp and tc are used to determine the nature of the fuel being combusted. This determination is made by comparing the number of cycles or the equivalent time required for the peak combustion pressure to occur and/or stablize, with a predetermined value in a manner as discussed hereinbefore. It is possible to use an algorithm for this purpose or alternatively use one or more multi-parameter maps or tables to enable look-up of the same. Viz., it may be desired to vary the value used for comparative purposes with engine coolant temperature in a manner that the value increases with decrease in coolant temperature.

Figure 11:
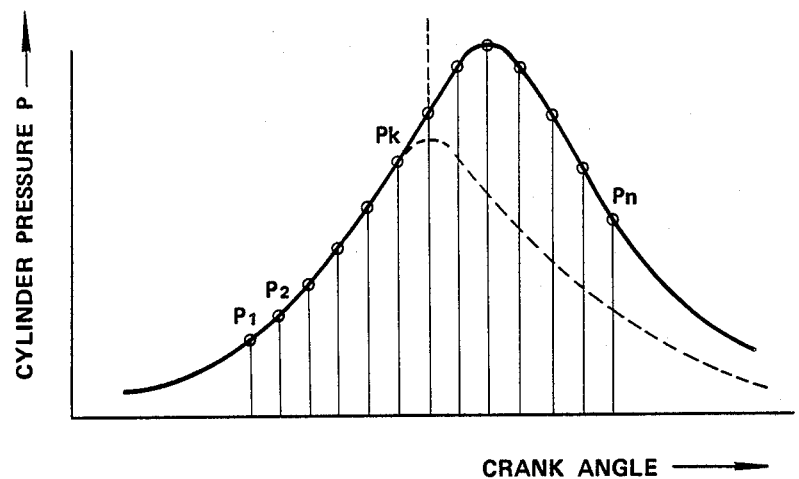
FIG. 11 depicts a combustion chamber pressure history sampling technique used in connection with the second embodiment of the present invention.
Figure 12:
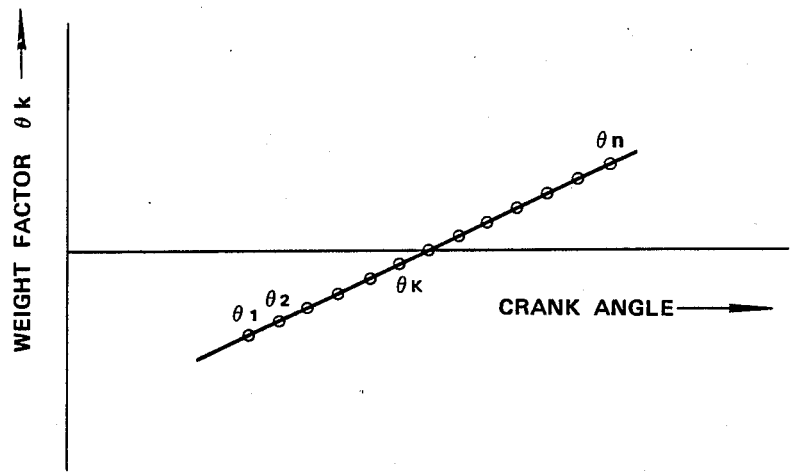
FIG. 12 shows in graphical form the weight factors which correspond to each of the sampling points shown in FIG. 11 and which are used in connection with the calculation of a center of gravity value used in the second embodiment of the present invention.
Figure 13:
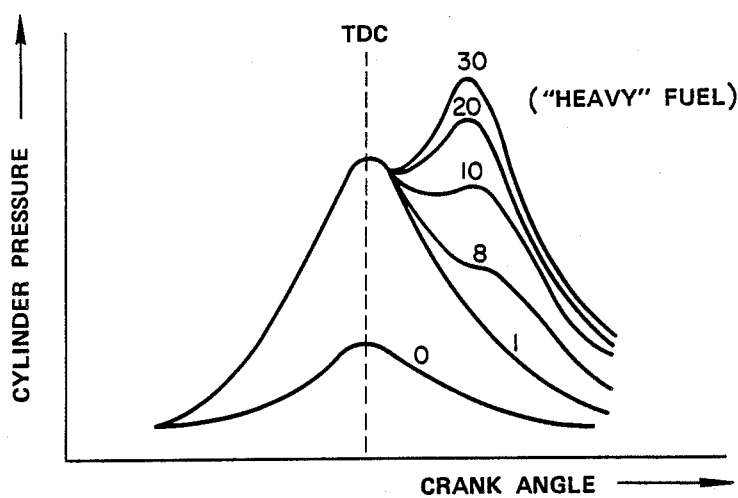
FIG. 13 is a graph which shows in terms of cylinder pressure and crank angle, a series of superimposed pressure histories which develop as the mode of engine operation changes from idling to a high load, on a cycle/cycle basis with the engine being supplied "heavy" fuel.
Figure 14:
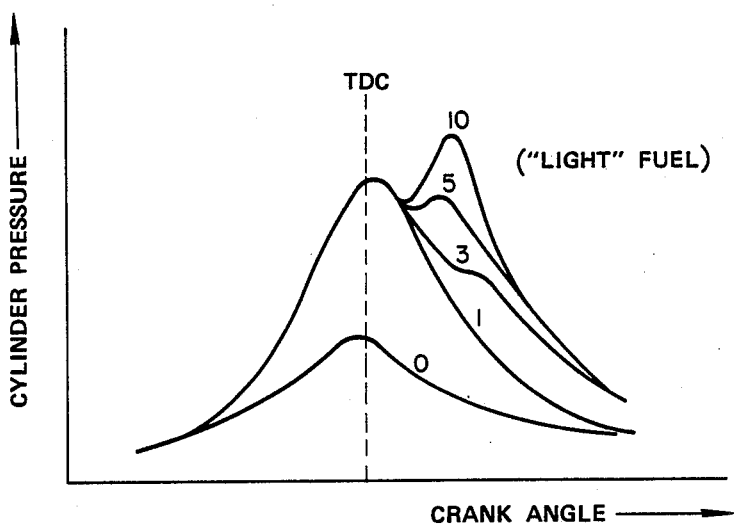
FIG. 14 is a graph which shows in terms of cylinder pressure and crank angle, a series of superimposed pressure histories which develop as the mode of engine operation transistionally changes from idiling to a high load, on a cyclc/cycle basis with the engine being supplied "light" fuel.

A second embodiment of the present invention features an arrangement wherein a predetermined number of pressure readings and corresponding crank angle readings are taken per cycle for a predetermined number of cycles. For example, a number of readings Pl to Pn as shown in FIG. 11 are taken. The corresponding crank angles $\theta 1-\theta n$ are converted into weigth factors the value of which vary as shown in FIG. 12.

Using this data two further sets of data are compiled. One takes the form of the maximum pressure value PMAX and the other is the center of gravity COG for each cycle.

The COG value is compiled using the following equation:

$$COG = \sum_{k=1}^{n} (Pk \times \theta k) / \sum_{k=1}^{n} Pk \quad (2)$$

Figure 15:
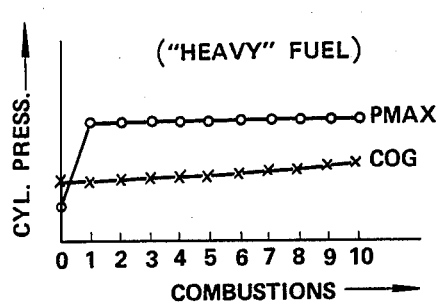
FIG. 15 is a chart which shows the changes which occur in the maximum pressure developed within the combustion chamber PMAX and a mathematically derived value COG over the first ten combustions or cycles which occur following the point in time whereat steady state operation is changed to a transitional one, with the engine being operated on "heavy" fuel.
Figure 16:
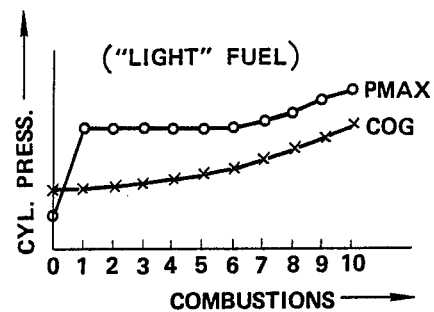
FIG. 16 is a chart which shows the changes which occur in a the maximum pressure developed within the combustion chamber PMAX and a mathematically derived value COG over the first ten combustions or cycles which occur following the point in time whereat steady state operation is changed to a transitional one, with the engine being operated on "light" fuel.

FIGS. 15 and 16 show the variations in PMAX and COG for heavy and light fuels, respectively, over a predetermined number of combustions or cycles of the engine (in this instance 10 cycles). As will be appreciated with heavy fuel the traces are essentially straight and exhibit little value to value change. However, in the case of light fuel the traces tend to curve slightly toward the end and thus exhibit a larger value to value difference than in the case of the heavy fuel. It will be undertood that due to the nature of the heavy fuel the PMAX and COG traces will tend to curve later somewhere in the 10 to 30 cycle region for example.

Thus, with the second embodiment it is possible to discern between light and heavy fuels by noting the magnitude in the value to value difference between readings.

Accordingly, algorithms which execute the following equations are prepared and stored in ROM $$\text{DELTA } PMAX = \frac{(PMAX[10] - PMAX[1])}{\sum_{i=1}^{10} PMAX[i]/10} \quad (3)$$

$$\text{DELTA COG} = \frac{(COG[10] - COG[1])}{\sum_{i=1}^{10} COG[i]/10} \quad (4)$$

By comparing the values derived using the above equations with predetermined minimum valves DELTA PMAXmin and DELTA COGmin it is possible to determine that heavy fuel is being combusted if the value is lower than the minimum one and light fuel if the value is higher. It is also possible to discern the fraction (eg. %) of the heavy fuel contained in the fuel actually being supplied to the engine by noting the degree by which the DELATA PMAX and DELTA COG vary above the minimum values.

Figure 9:
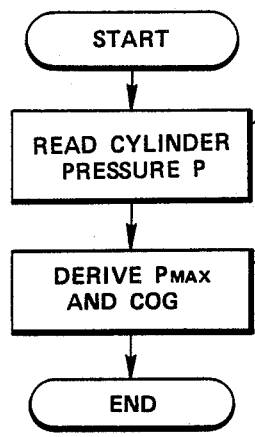
FIGS. 9 and 10 are flow charts which show the steps executed in accordance with a second embodiment of the present invention.
Figure 10:
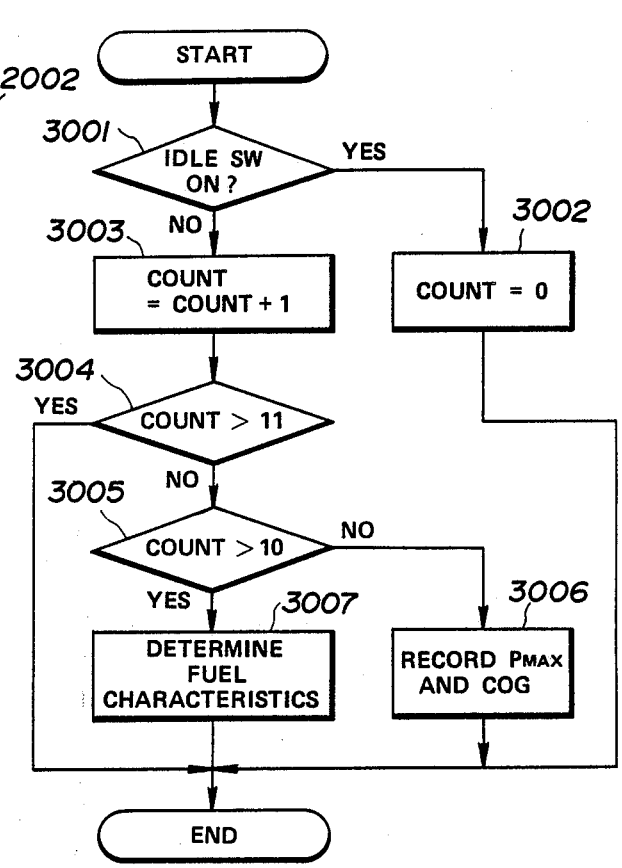

FIGS. 9 and 10 show flow charts which depict the chacteristic steps which are executed in order to implement the second embodiment of the present invention.

FIG. 9 shows the steps which are executed in accordance with the above disclosure. This program is induced to run a predetermined number of times during a period which begins toward the end of the compression phase and which finishes near the end of the expansion phase of the engine—see FIG. 11 by way of example.

The program shown in the flow chart of FIG. 10 is arranged to run once per cycle of the cylinder under examination.

The first step 3001 of this program is such as to sample the output of the idle switch 108. If the switch is ON indicating that the engine is operating under low load non-transitory conditions the program flows to step 3002 wherein the count of a soft clock is reset to zero. This clock is arranged to increment each cycle of the cylinder under examination. Following the reset the program ends.

Alternatively, in place of using the idle switch it is possible to ascertain if the engine is operating in a transitory mode or not. However, via the use of the idle switch 108 it is possible to unify some of the conditions under which the "analysis" of the fuel is conducted. That is to say, whenever the program proceeds from step 3001 to 3003 the engine is alway being accelerated from idle. Viz., this tends to induce the same intitial load, engine speed, induction conduit wetting and A/F ratio conditions.

At step 3003 the clock is induced to count up by one and at steps 3004 and 3005 the count of the clock is ranged to determine if the required number of PMAX and COG smaples have been recorded or not. While the count is below the predetermined number (in this case 10) the program flows to step 3006 wherein the data compiled using the program depicted in FIG. 9 is recorded in RAM. Upon the predetermined of cycles being reached the program goes to step 3007 wherein the fuel characteristics are determined using equations (3) and (4) set forth hereinabove and the results compared with predetermined values.

It is within the scope of the present invention to change the magnitudes of the minimum values used in the instant embodiment with change in engine coolant temperature. For this purpose a sub routine can be included in the program and used to sample the output of the engine coolant temperature sensor 106 and to execute a table look up or the like in order to determine what the magnitude of the the two minimum values should be.

It will be understood that the above description is illustrative of the ability of the present invention to distinguish very rapidly the difference between heavy and light fuel. However, the present invention is not limited to discriminating between only two discrete types of fuel and can be expanded (as previously mentioned) in a manner which permits discretion between mixtures of heavy and light fuels. By way of example only, in the first embodiment, in the event that the maximum pressure occurs in the 6 to 7th cycle region it could be assumed that the fuel being supplied into the engine contains approximately a 50/50 mix of heavy and light or at least sufficient heavy fuel to reduce the rate per cycle at which the pressure in the combustion chamber increases.

It is further within the scope of the invention to use the average rate of change in pressure per cycle or the like as a parameter in place of and/or in combination with the above discretionary techniques.

The ability to distingish between the types of fuel broadens the scope of engine control. The control is not limited to fuel supply and can be extended to ignition and EGR control and the like. Viz., depending of the nature of the fuel being combusted shifting of the ignition timing can promote improved acceleration and fuel economy particulary if combined with injection and A/F control.

For further disclosure relating to the above type of technique and related matters such as calibrating the pressure sensor 100, reference may be had to U.S. Pat. No. 4,531,399 issued on July 30, 1985, 4,538,454 issued on Sept. 3, 1985 and 4,556,030 issued on December 1985 all in the name of Aono. The content of these documents is hereby incorporated by reference thereto.

Figure 17:
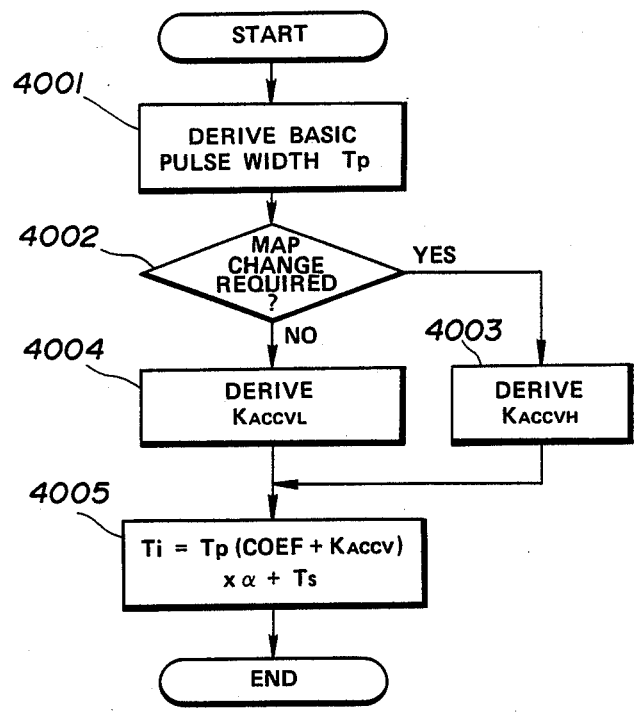
FIGS. 17 and 18 are flow charts showing the steps which characterize the fuel injection control according to a third embodiment of the present invention and which can implemented in conjunction with either of the first and second embodiments.

FIG. 17 shows in flow chart form a fuel injection control program which is adapted to be responsive to the analysis which is performed with the first and second embodiment of the invention. The pulse width Ti via which electronically controlled fuel injectors are operated is calculated using the following equation: viz., $$Ti = Tp(COEFF = Kaccv) \times ALPHA \times Ts \quad (5)$$

It will be noted that this equation is essentially similar to equation (1) but differs in that the basic acceleration correction factor Kacc is replaced with a variable one Kaccv. The value of this variable factor is determined on the basis of the fuel and/or other factors such as coolant temperature as will become more apparent as the following description proceeds.

The first step 4001 of the FIG. 17 flow chart is such as to derive the basic pulse width Tp. Following this depending on the outcome of the fuel analysis, it is determined in step 4002 if it is necessary to change a map or table via which the instant correction factor is derived to one suitable for heavy fuel or vice versa. Viz., in the event that the fuel analysis indicates that the engine is being supplied light fuel, then a map recorded in terms of correction factor Kaccvl is maintained. Viz., in the instant embodiment it is possible that the system is arranged so as to default upon system reset to a map suited for light fuel. However, it should be noted that it is advantageously within the scope of the present invention to arranged the program so that between resets the result of the last recorded analysis is stored in RAM and maintained there even during periods when the engine is not in use. Thus, when the engine is restarted, a map which most suited to type of fuel indicated by the last performed analysis is initially used. However, in the event that heavy fuel (or a fuel which contains a larger or smaller amount of heavy fuel or vice versa) is deemed to be currently supplied to the engine (step 4002) then a new map is read out of ROM and installed in the work space of the CPU. It is of course clear that the present invention is not limited to the use of two types of map and that a suitable number of the same can be prepared and stored in ROM as desired. Factors effecting this decision are of course the cost or preparing the same, the capacity of the ROM in use the resolution with which the fuel content must be "analysed" and similar considerations.

In brief, is possible to simply look upon steps 4003 and 4004 as being steps which select maps in manner which brings out one which is most suited to the result of the instant "analysis".

At step 4005 the actual injection pulse width Ti is calculated using the equation as shown, the value is set in a register and the program ends.

Figure 18:
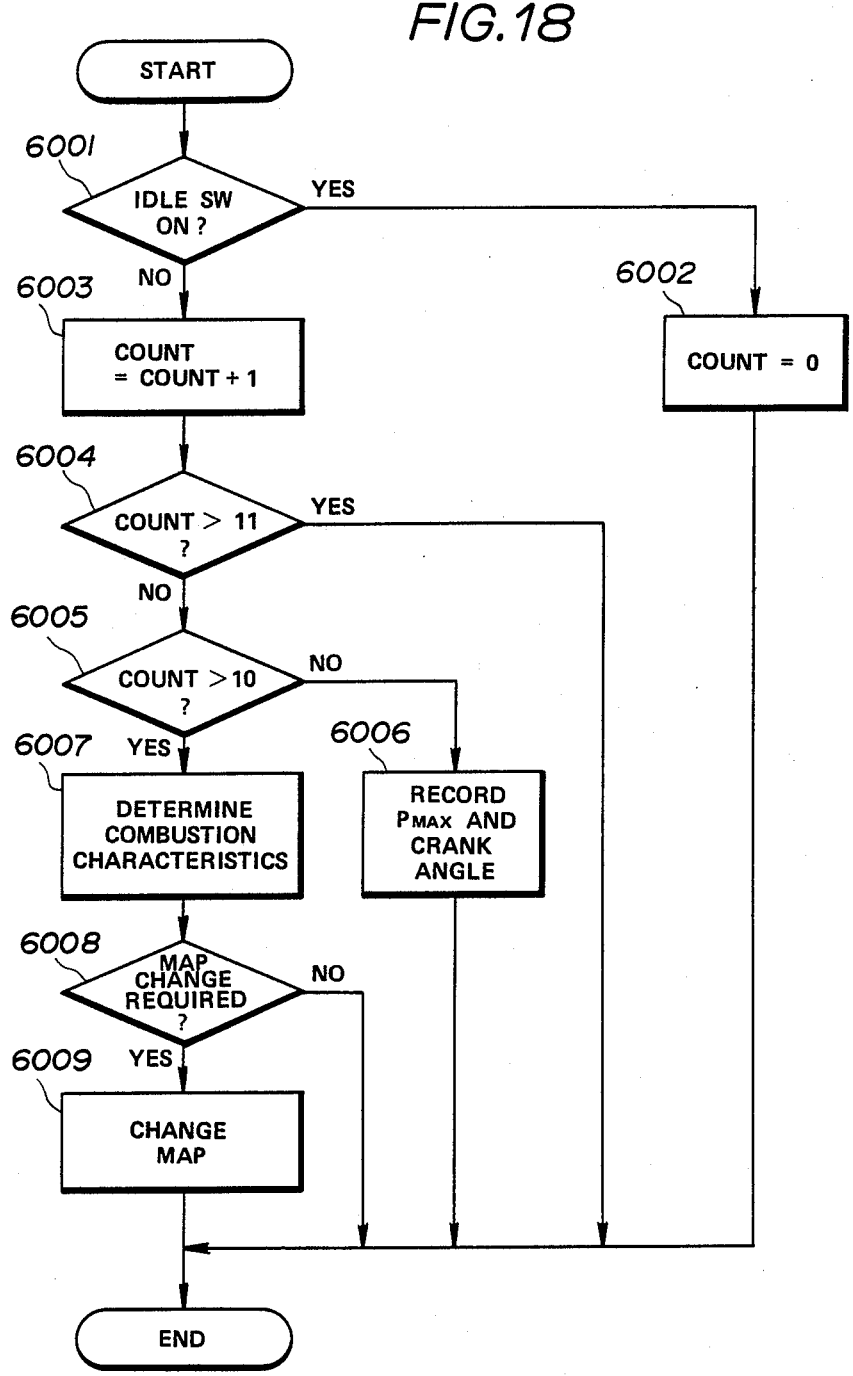

FIG. 18 shows a routine via which the decision which is conducted in step 4002 can be made. This program is run once per cycle of the engine. As will be appreciated, a soft clock is built into the program to count up over a predetermined number of cycles and to induce the appropriate number of data to be sampled and recorded. Step 6006 employs a sub-routine of the nature shown in FIG. 9 to sample a given number of pressure readings from which the peak combustion pressure can be detected.

At steps 6007, 6008 and 6009 the nature of the fuel is determined, the outcome compared with the currently used control characteristics, the need to change or to maintain the currently used control data made and if necessary a command to change the map to a more appropriate one issued (step 6009). This step can be arranged, in the event that more than two maps are available to switch to the next map and await the next run to determine if a further shift is necessary. The number of various possible techniques available at this stage of control will be obvious to those skilled in the art of programming when equipped with the concept of the present invention. Viz., it would not be improper with aging of the engine, injectors etc., to revise the above mentioned maps along with any of the others involved with the embodiments and possible spin offs of the same, in a manner to more appropriate suit the instant condition of the hardward involved. For further reference to this particular facet reference may be had to U.S. Pat. No. 4,594,669 issued on June 10, 1987 in the name of Hosaka.

Figure 19:
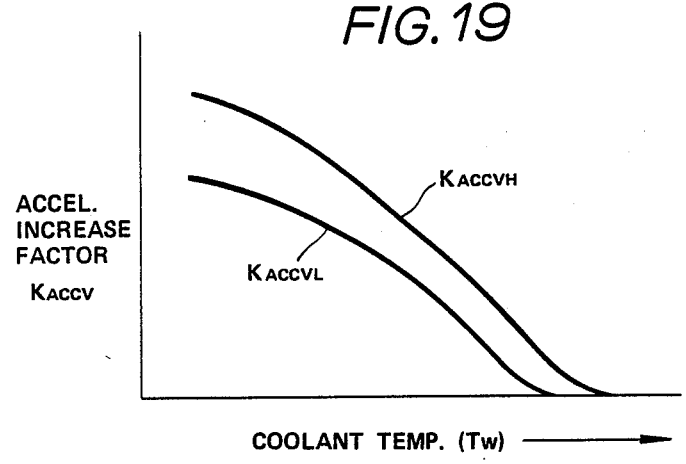
FIG. 19 is a graph showing in terms of an acceleration increase factor (Kaccv) and engine coolant temperature (Tw) the changes which occur in the correction factors for light and heavy fuels.

FIG. 19 graphically shows both of the heavy and light fuel correction factors Kaccvl and Kaccvh in terms of the factor magnitude and coolant temperature. It will be noted that the magnitudes of the correction factors diminish with increasing engine coolant temperature but are relatively high at low temperatures. Hence, the effect of the same at low temperatures is considerable. Thus, it is advantageously within the scope of the present invention to modify the value of the correction factors Kaccvl and Kaccvh with respect to coolant temperature. To achieve this end sub-routines can be run in steps 4003 and 4004 which read the output of the coolant temperature sensor 106 and read off the appropriate value of Kaccvl or Kaccvh from suitable tables which are individually prepared for each of the factors and which are read out of ROM in response to the outcome of step 6007.

The present invention is not limited to the control under transient modes of the operation wherein modification of the Vaccv factors is executed, and can be also used to further pertinently modify the calculation of the injection control pulse width under non-transient modes of operation.

For example, if the injection control is developed according to the following equation which includes a further factor Kv; viz., $$Ti = Tp(COEFF + Kacc + Kv) \times ALPHA \times Ts \quad (6)$$

wherein:

-Kacc denotes a basic acceleration correction factor; and

Kv denotes a correction factor which varies with the fraction of heavy fuel contained in that being supplied to the engine. With this equation it becomes possible to use both factors (Kaccv and Kv) under transient modes of engine operation and arbitarily set Kaccv to zero under non-transient modes so that only the Kv factor provides a corrective effect.

Figure 21:
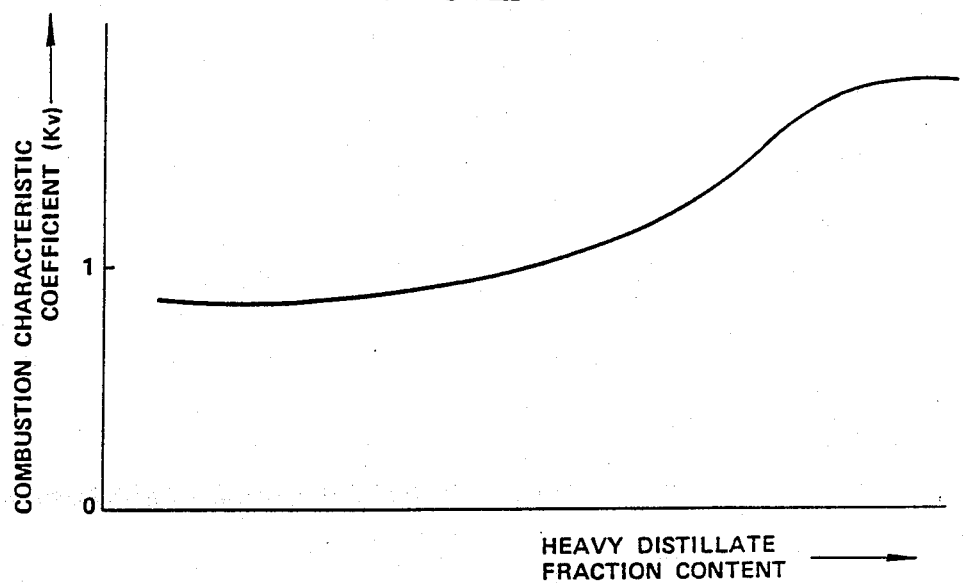
FIG. 21 is a graph which shows the relationship which is developed between a combustion characteristic coefficient (Kv) and the heavy distillate (fuel) fraction content.

FIG. 21 shows the relationship between the combustion characteristic coefficient Kv (as it will be referred to hereinafter) and the heavy fuel distillate fraction content.

By setting a map of the nature illustrated in FIG. 21 in ROM it is possible by using the values DELATA PMAX and DELTA COG (by way of example) to determine the amount (eg. %) of heavy fuel contained in that actually being injected into the engine, to read off an appropriate value of Kv. It is also possible to further improve the accuracy of the control by further using coolant temperature in combination with the two parameters shown in FIG. 21 in a manner to develop a table which when illustrated takes the form of a three-dimensional contour map.

Figure 20:
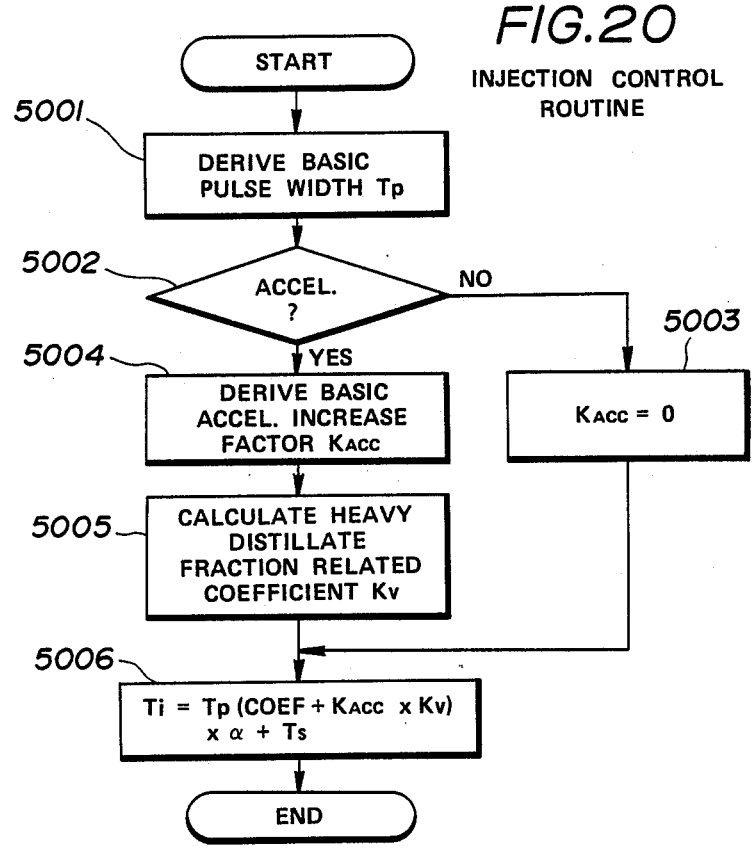
FIG. 20 is a flow chart showing the steps which characterize a fourth embodiment of the present invention wherein the calculation of the injection control pulse width includes a both a basic acceleration correction factor Kacc and one for steady state operation Kv, the latter correction factor Kv (combustion characteristic coefficient) being such as to indicate the amount of heavy fuel which is contained in that being supplied to the engine.

In more detail, the operation of this embodiment is set forth in flow chart form in FIG. 20. As shown, the first step 5001 of this routine is such as to calculate the basic pulse width Tp. Following this, it is determined in step 5002 whether the engine is operating under transient or non-transient conditions. In the event that non-transient conditions are detected the value of Kaccv is set to zero in step 5003 and the program goes to step 5006 wherein the equation set forth above is executed. However, in the event that the engine has entered a transient mode of operation the basic acceleration increase factor Kaccv is derived (step 5004). This derivation of course can take be performed in accordance with the techniques set forth hereinbefore. Subsequently at step 5005 the heavy distillate fraction is determined and the combustion characteristic coefficient Kv derived by table look-up. Of course, as an alternative to table look-up, a suitable algorithm may be used for this purpose if so desired.

The program then goes to step 5006 the derivation of Ti carried out and the value thereof set in register ready for injection control.

Figure 22:
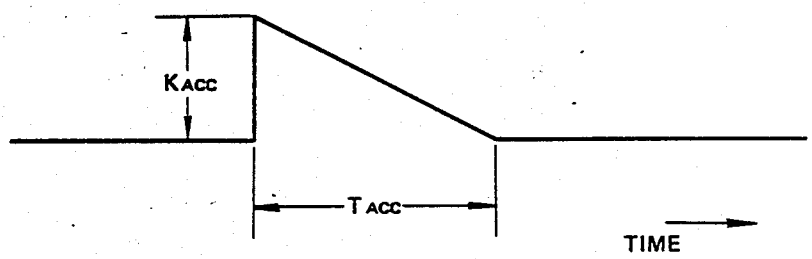
FIG. 22 is a chart which shows the relationship between the magnitude of the acceleration correction factor Kacc and a time period Tacc which is varaible in accordance with the "analysis" of the fuel content, and which characterizes the operation of a fifth embodiment of the present invention.

In the third and fourth embodiments after the detection of a transient mode of operation only the value of acceleration increase factor Kaccv or the combustion characteristic coefficient Kv are variable while the value of the basic acceleration correction factor Kacc remains constant. Thus, when the mode of operation changes from transient to non-transient the value of Kacc is, in the fourth embodiment for example, suddenly set to a zero value. To smooth out this sudden change in the total corrective section (COEFF + Kacc × Kv) of equation (6) the fifth embodiment provides for the value of Kacc to decrease over a period of time Tacc the length of which is variable in accordance with the value of Vc. That is to say, as shown in FIG. 22 the value of Kacc is induced to reduce in the illustrated manner over the period Tacc. Although it is possible to fix period Tacc, is it is deemed advantageous to vary the same with respect to the level of the calcuated variable Vc (or alternatively Kaccv in the third embodiment) in order to improve the A/F control.

A sixth embodiment of the present invention features controlling the injection pulse width during cranking and starting of the engine. This control of course facilitates prompt starts and avoids injecting either too much or too little fuel during this period. This control is particularly useful in the event that the fuel contains an amount of alcohol and/or the like heavy fuel.

Figure 23:
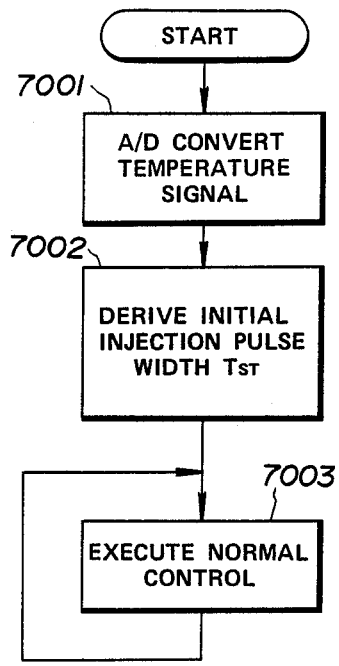
FIGS. 23 to 25 are flow charts which depict the characterizing operations performed in connection with a sixth embodiment of the present invention wherein the width of the injection pulse during cranking and initial start up of the engine in modified in accordance with the fuel analysis.

FIG. 23 shows a control technique via which the injection pulse width Tst used during engine cranking can be determined. As shown, during this start-up period the output of the engine coolant temperature sensor 106 is sampled, A/D converted and then set in RAM (step 7001). Following this the initial injection pulse width Tst is derived by table look-up (see FIG. 27) or the like and set in a register ready for injection control which is executed in step 7003. However, this technique fails to take into account the fact that a vastly larger amount of fuel should be injected in the event that the fuel consists of a mixture of gasoline and alcohol, for example. Thus, with the sixth embodiment of the present invention by modifying the vaue of Tst with a correction factor Kvs it is possible to pertinently modify the amount of fuel which is supplied to the engine which promotes promt start-up and reduces noxious HC type emissions due to prolonged cranking which tends to pump unburnt fuel wastefully into the exhaust system of the vehicle.

Figure 25:
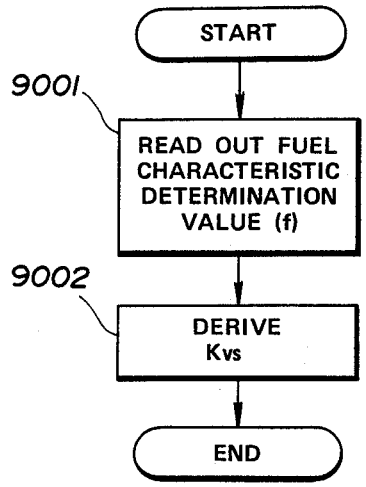

FIG. 25 shows in flow chart form a sub-routine which can be used to determine the value of Kvs. The first step of this routine is such as to take the last recorded values of DELTA COG and DELTA PMAX and perform a table look-up (using a two dimensional matrix of the nature shown in FIG. 26) in order to determine the value of a fuel characteristic determination value (f). Using this value (f) the value of Kvs is determined using the relationship depicted in FIG. 28. This determination can be carried out by either table look-up or via the use of a suitable alogrigthm.

Figure 24:
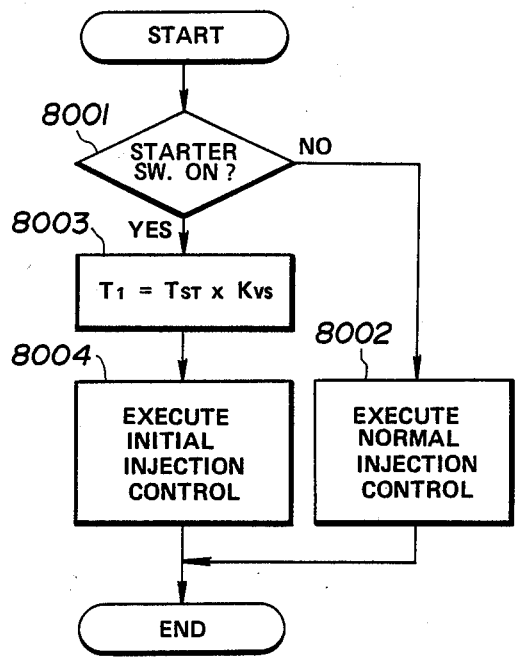

The above data is used in a manner as set forth in the flow charyt of FIG. 24. In this routine the first step determines if the engine is being cranked or not by sampling the status of the starter switch. If the switch if off indicating that the engine is running, the program goes to step 8002 wherein normal injection control—viz., the control such as disclosed hereinbefore in connection with FIGS. 17 & 18 or 20. On the other hand, if the starter switch is found to be on, then at step 8003 the injection pulse Ti is determined using the following equation:

$$Ti = Tst \times Kvs \qquad (7)$$

Following this, initial injection control is performed using the value of Ti as calculated above. Upon the engine starting and the RPM reaching a predetermined level (indicative of the engine producing the rotation under its own operation) the initial injection control can be stopped and normal control executed according to the injection control techniques set forth hereinbefore.

What is claimed is:

1. In a method of controlling an internal combustion engine the steps of:
   sensing a parameter which varies with the combustion process which occurs in a combination chamber;
   determining a first variable based on the sensing of said parameter; and
   determining the type of fuel being supplied to the engine using said first variable;
   wherein said sensing step takes the form of sensing the pressure which develops in the combustion chamber, wherein said pressure is sensed over a predetermined crank angle range and wherein the magnitude of the sensed pressure is recorded along with the corresponding crank angle at predetermined intervals;
   wherein said step of determining said first variable includes determining and recording the maximum pressure and corresponding crank angle for each of a predetermined number of engine cycles; and
   wherein said fuel type determining step comprises: determining the cycle at which the highest maximum pressure occurs; comparing this with a predetermined cycle; and determining the fuel to be a first type when the cycle at which the highest maximum pressure occurs, occurs before said predetermined cycle; and determining the fuel to a second type when the cycle at which the highest maximum pressure occurs, occurs after said predetermined cycle.

2. A method as claimed in claim 1 wherein said pressure sensing step is only conducted from the time that the operation of the engine changes from a non-transitory mode of operation to a transitory one.

3. A method as claimed in claim 2 wherein said pressure sensing step is conducted for one of a predetermined time or a predetermined number of engine cycles after the engine changes from said non-transitory mode of operation to said transitory one.

4. A method as claimed in claim 2, wherein said pressure sensing step is conducted after the load on the engine increases above a predetermined low value.

5. A method as claimed in claim 4 further comprising the step of using a switch which is closed when the engine is idling and which opens when the load on the engine on the engine is increased to indicate the load increasing above said predetermined low value.

6. A method as claimed in claim 1 further comprising the step of controlling the supply of fuel to said engine in accordance with the outcome of said fuel type determining step.

7. A method as claimed in claim 6 wherein said fuel supply controlling step comprises:
   injecting fuel using an electronically controlled fuel injector into an induction conduit which leads to the combustion chamber in which the pressure under examination is developed; and
   calculating the injection control pulse for said electronically controlled fuel injector using the general equation of:

$$Ti = Tp \times (correction\ factor)$$

wherein:
   Tp is the basic injection pulse width calculated using engine speed and engine load indicative parameters; and wherein
   the (correction factor) is in part variable in response to said fuel type determining step.

8. In a method of controlling an internal combustion engine the steps of:
   sensing a parameter which varies with the combustion process which occurs in a combustion chamber;
   determining a first variable based on the sensing of said parameter; and
   determining the type of fuel being supplied to the engine using said first variable;
   wherein said sensing step takes the form of sensing the pressure which develops in the combustion chamber, wherein said pressure is sensed over a predetermined crank angle range and wherein the magnitude of the sensed pressure is recorded along with the corresponding crank angle at predetermined intervals;
   wherein said step of determining said first variable includes determining and recording the maximum pressure and corresponding crank angle for each of a predetermined number of engine cycles; and
   wherein said fuel type determining step includes:
   determining the difference of the first and last of said predetermined number of maximum pressure values and dividing the difference by the average maximum pressure:
   determining a combustion pressure characteristic value for of each of the predetermined number of engine cycles by summing the product of each of the pressure values recorded per cycle, with a weight factor which varies in proportion to the crank angle at which each of the pressure values was recorded, and dividing the total with the sum of the pressure values; and
   determining the difference in the combustion pressure characteristic values by obtaining the difference between the first and the last of the predetermined number of combustion pressure characteristic values and dividing the result with the average of the combustion pressure characteristic values.

9. A method as claimed in claim 8 wherein said fuel type determining step further includes:
comparing the maximum pressure difference and the combustion pressure characteristic value difference with predetermined values; and
determining the type of fuel based on the difference between the maximum pressure difference and the combustion pressure characteristic value difference and the respective predetermined values with which they are compared.

10. A method as claimed in claim 8 wherein said fuel type determining step includes determining a fuel characteristic coefficient by using said maximum pressure difference and said combustion pressure characteristic value difference to perform a table look-up wherein the table takes the form of a two dimensional matrix of fuel characteristic coefficients.

11. In an apparatus for controlling an internal combustion engine:
means for sensing a parameter which varies with the combustion process which occurs in a combustion chamber of the engine;
means for determining:
(a) a first variable based on the sensed magnitude of said parameter; and
(b) the type of fuel being supplied to the engine;
wherein said pressure sensing means senses the pressure which develops in said combustion chamber over a predetermined crank angle range and wherein said determining means records the magnitude of the pressure along with the corresponding crank angle at predetermined intervals;
wherein said determining means determines and records the maximum pressure and corresponding crank angle for each of a predetermined number of engine cycles; and
wherein said determining means comprises means for:
determining the cycle at which the highest maximum pressure occurs;
comparing this with a predetermined cycle; and
determining the fuel to be a first type when the cycle at which the highest maximum pressure occurs, occurs before said predetermined cycle; and
determining the fuel to a second type when the cycle at which the highest maximum pressure occurs, occurs after said predetermined cycle.

12. An apparatus as claimed in claim 11 wherein said sensing means takes the form of a sensor which senses the pressure which develops in the combustion chamber.

13. An apparatus as claimed in claim 12 wherein said pressure sensing means only conducts pressure value sampling from the time that the operation of the engine changes from a non-transitory mode of operation to a transitory one.

14. An apparatus as claimed in claim 13 wherein said pressure sensing means conducts pressure sampling for one of a predetermined time or a predetermined number of engine cycles after the engine changes from said non-transitory mode of operation to said transitory one.

15. An apparatus as claimed in claim 13 wherein said pressure sensing means conducts pressure sampling after the load on the engine increases above a predetermined low value.

16. An apparatus as claimed in claim 15 further comprising a switch which is cloased when the engine is idling and which opens when the load on the engine on the engine is increased to indicate the load increasing above said predetermined low value.

17. An apparatus as claimed in claim 11 further comprising a fuel supply system for controlling the supply of fuel to said engine in accordance with the type of fuel determined by said fuel type determining means.

18. An apparatus as claimed in claim 17 wherein said fuel supply system comprises:
an electronically controlled fuel injector which injects fuel into an induction conduit which leads to the combustion chamber in which the pressure under examination is developed; and
a circuit for calculating the injection control pulse for said electronically controlled fuel injector using the general equation of:

$$Ti = Tp \times (\text{correction factor})$$

wherein:
Tp is the basic injection pulse width calculated using engine speed and engine load indicative parameters; and wherein
the (correction factor) is in part variable in response to said fuel type determining step.

19. In an apparatus for controlling an internal combustion engine:
means for sensing a parameter which varies with the combustion process which occurs in a combustion chamber of the engine;
means for determining:
(a) a first variable based on the sensed magnitude of said parameter; and
(b) the type of fuel being supplied to the engine;
wherein said pressure sensing means senses the pressure which develops in said combustion chamber over a predetermined crank angle range and wherein said determining means records the magnitude of the pressure along with the corresponding crank angle at predetermined intervals;
wherein said determining means determines and records the maximum pressure and corresponding crank angle for each of a predetermined number of engine cycles; and
wherein said determining means includes circuitry for: determining the difference of the first and last of said predetermined number of maximum pressure values and dividing the difference by the average maximum pressure:
determining the a combustion pressure characteristic value for each of the predetermined number of engine cycles by summing the product of each the pressure values recorded per cycle with a weight factor which varies in proportion to the crank angle at which each of the pressure values was recorded, and dividing the total with the sum of the pressure values; and
determining the difference in the combustion pressure characteristic values by obtaining the difference between the first and the last of the predetermined number of combustion pressure characteristic values and dividing the result with the average of the combustion pressure characteristic values.

20. An apparatus as claimed in claim 19 wherein said determining means includes circuitry for:

comparing the maximum pressure difference and the combustion pressure characteristic value difference with predetermined values; and determining the type of fuel based on the difference between the maximum pressure difference and the combustion pressure characteristic value and the respective predetermined values with which they are compared.

21. An apparatus as claimed in claim 19 wherein said determining means includes circuitry for:

determining a fuel characteristic coefficient by using said maximum pressure difference and said combustion pressure characteristic value difference to perform a table look-up wherein the table takes the form of a two dimensional matrix of fuel characteristic coefficients.

* * * * *